Aug. 6, 1963 R. G. SPALDING 3,100,062
INDICATING APPARATUS FOR DISPENSING SYSTEM
Filed Feb. 6, 1962 11 Sheets-Sheet 1
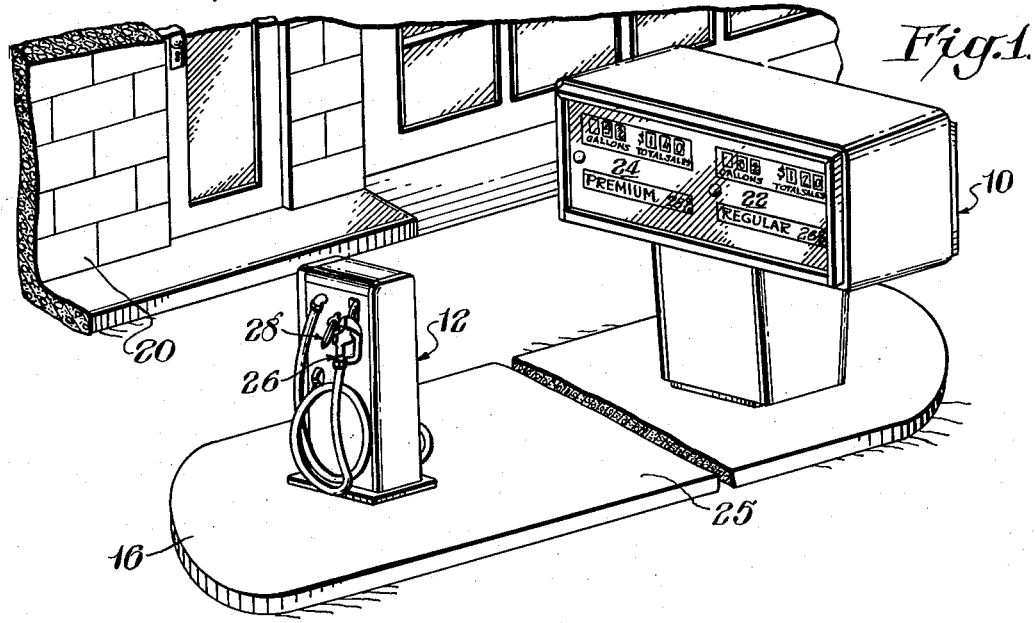
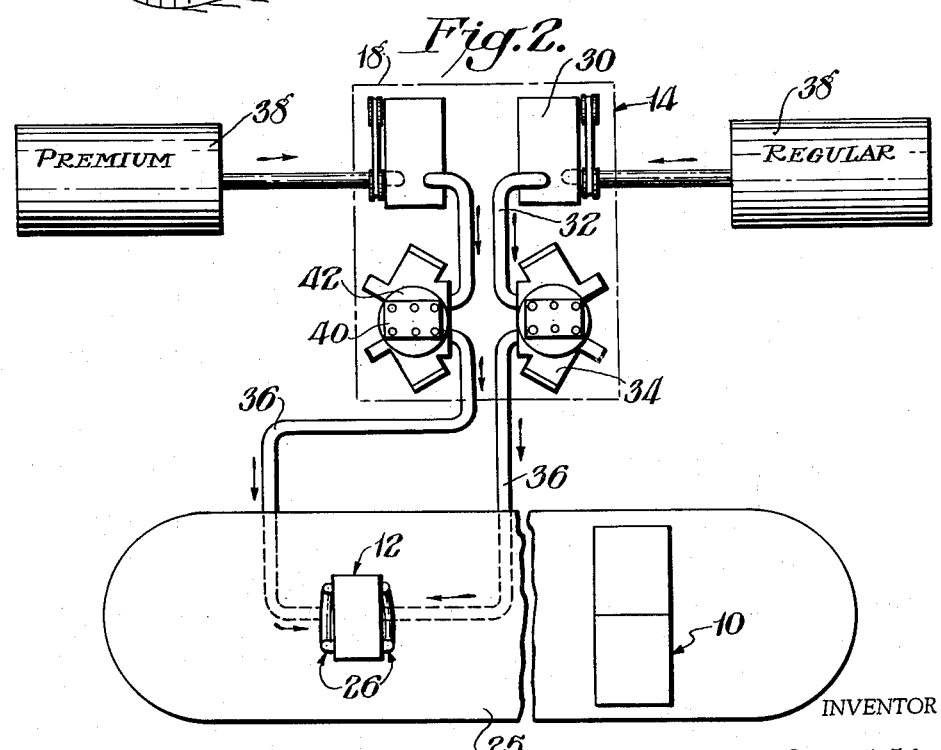
INVENTOR
Robert G. Spalding
BY Connolly and Hutz
ATTORNEYS

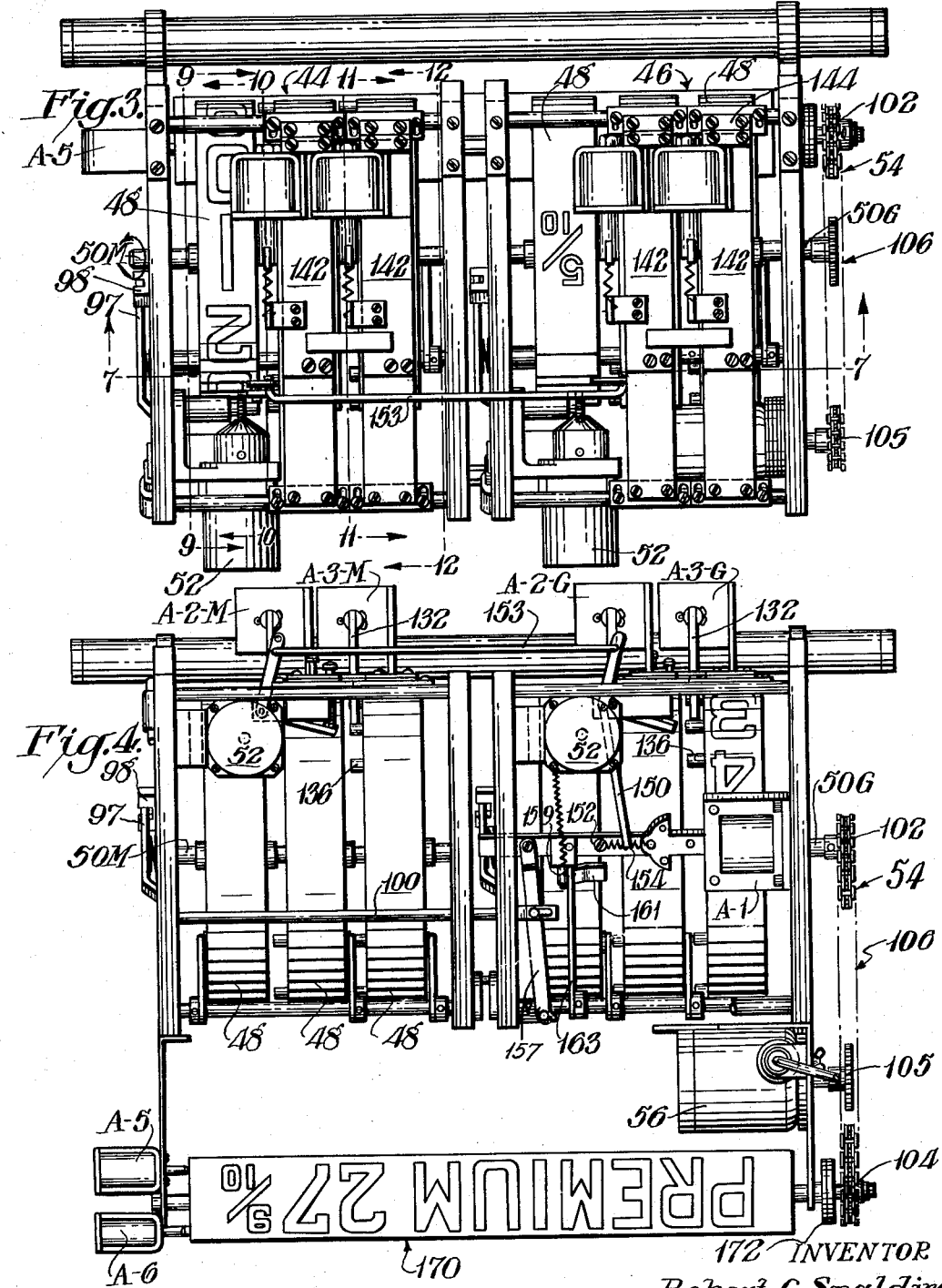

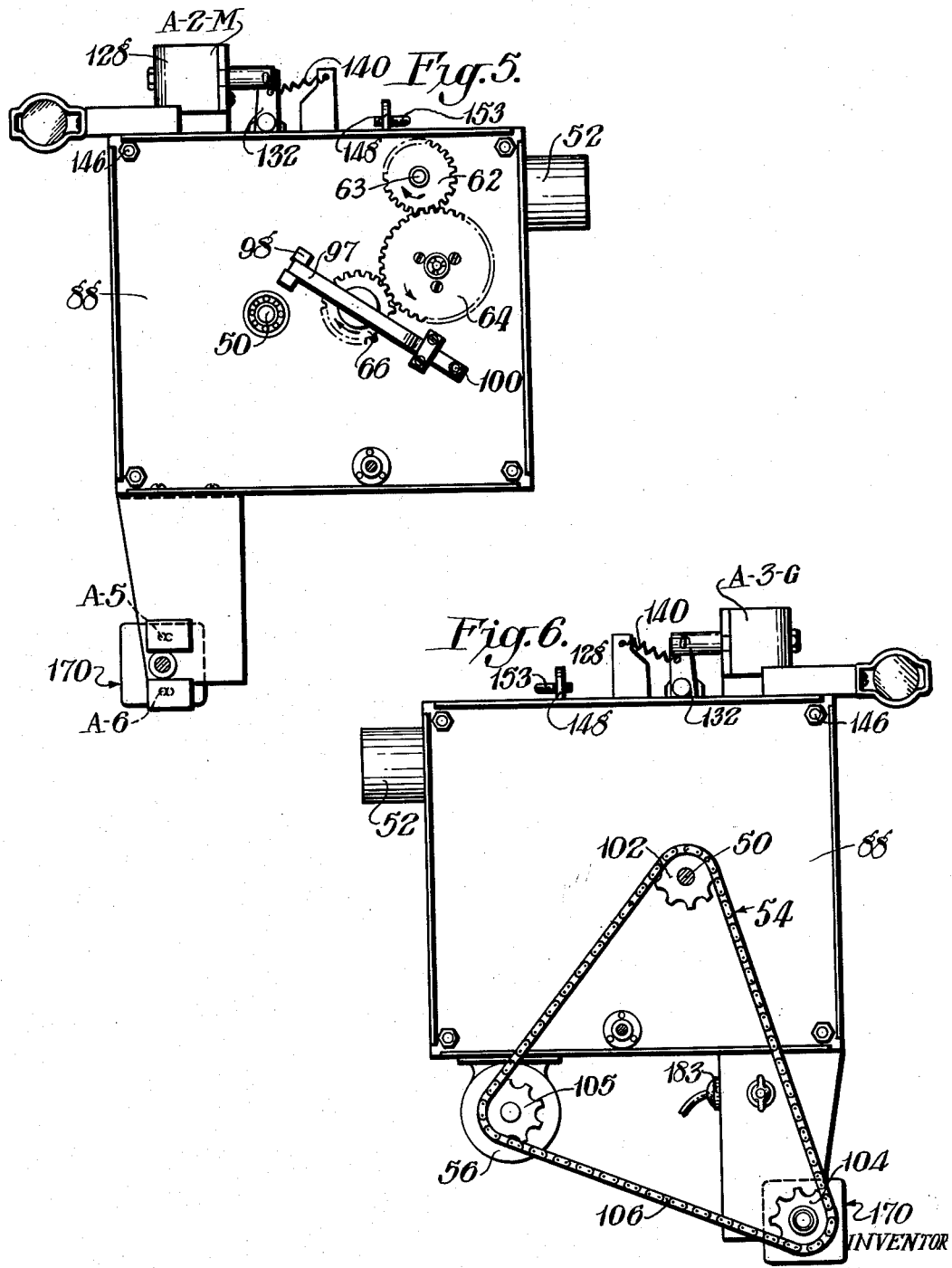

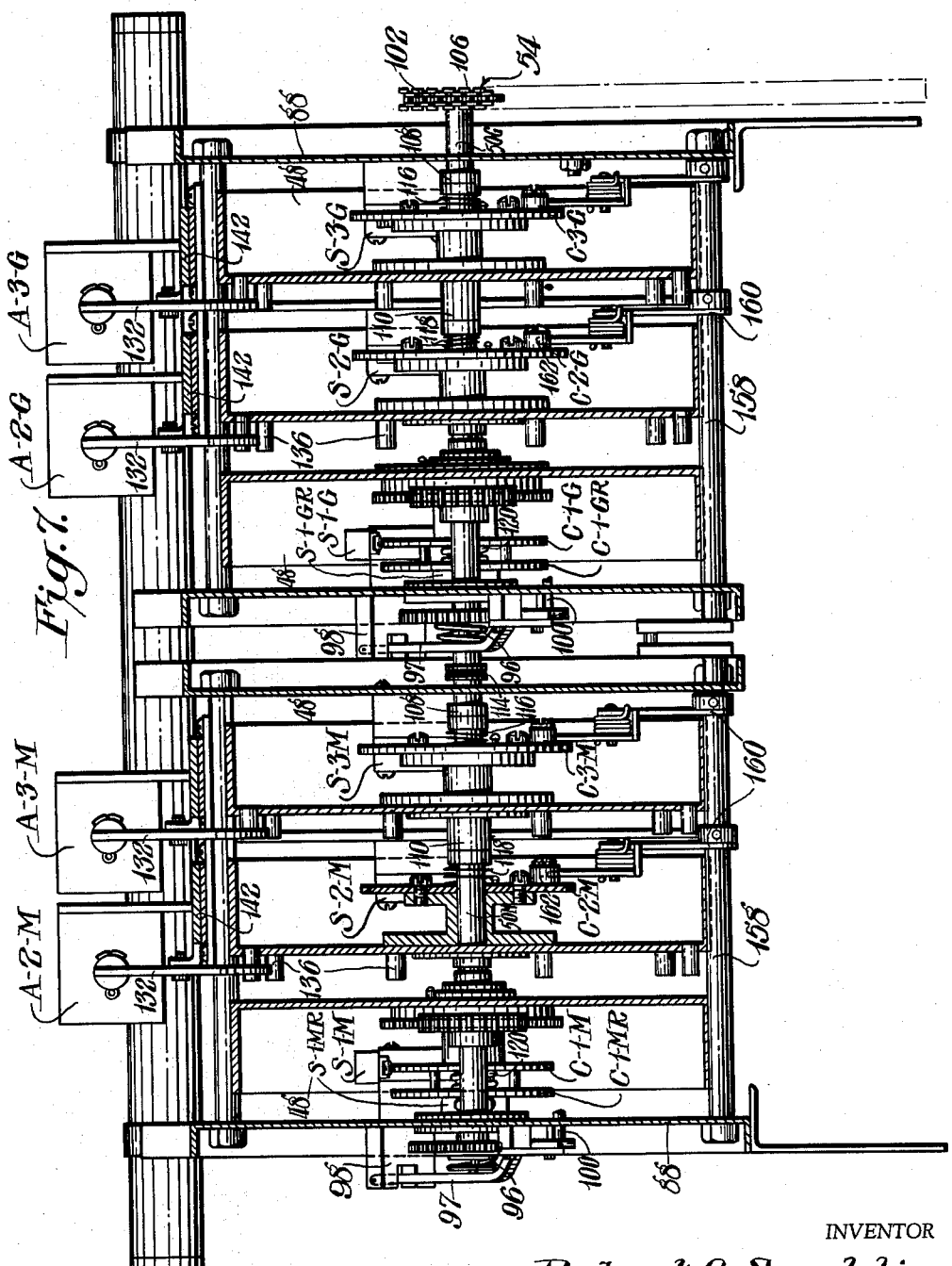

Aug. 6, 1963 R. G. SPALDING 3,100,062
INDICATING APPARATUS FOR DISPENSING SYSTEM
Filed Feb. 6, 1962 11 Sheets-Sheet 5
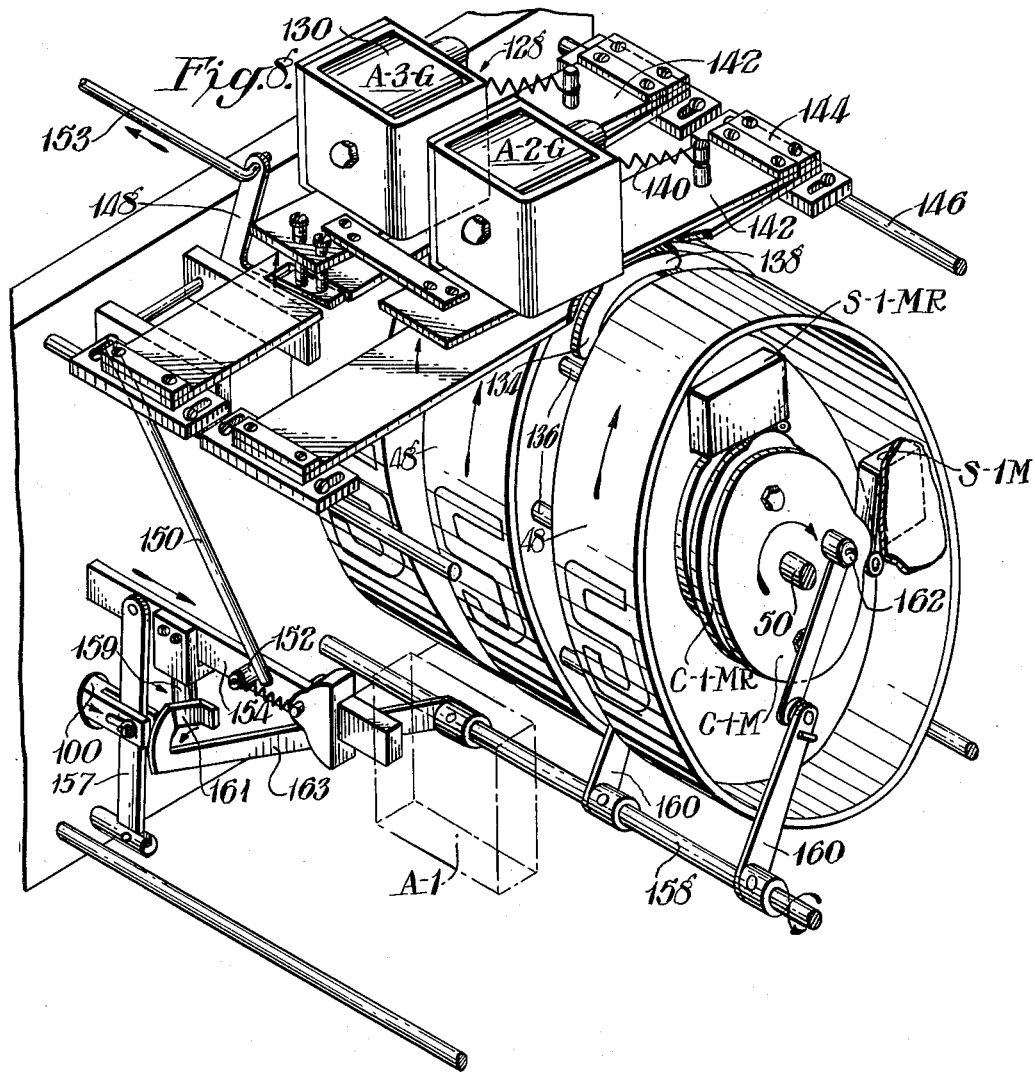
INVENTOR
Robert G. Spalding
BY Connolly and Hutz
ATTORNEYS

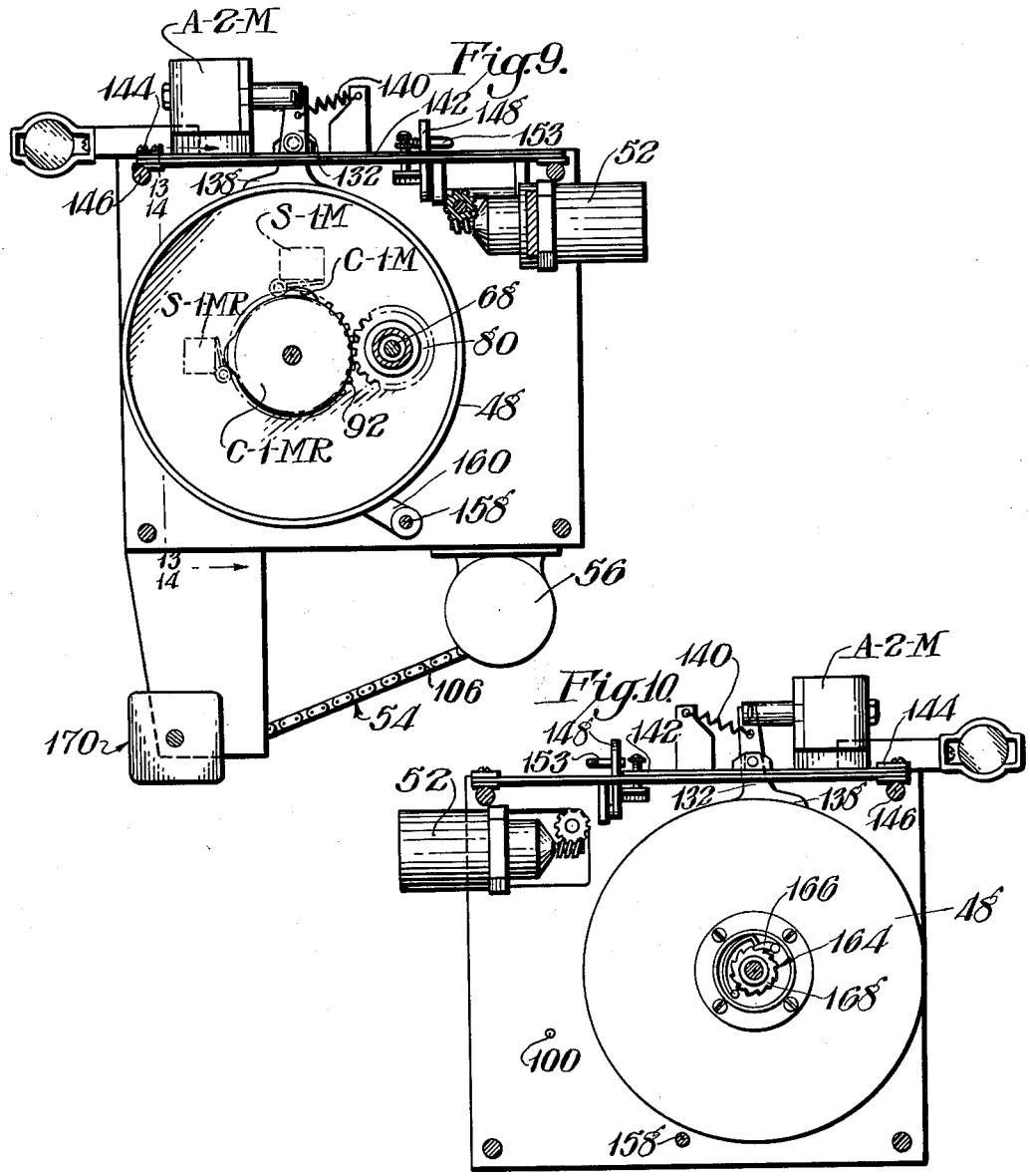

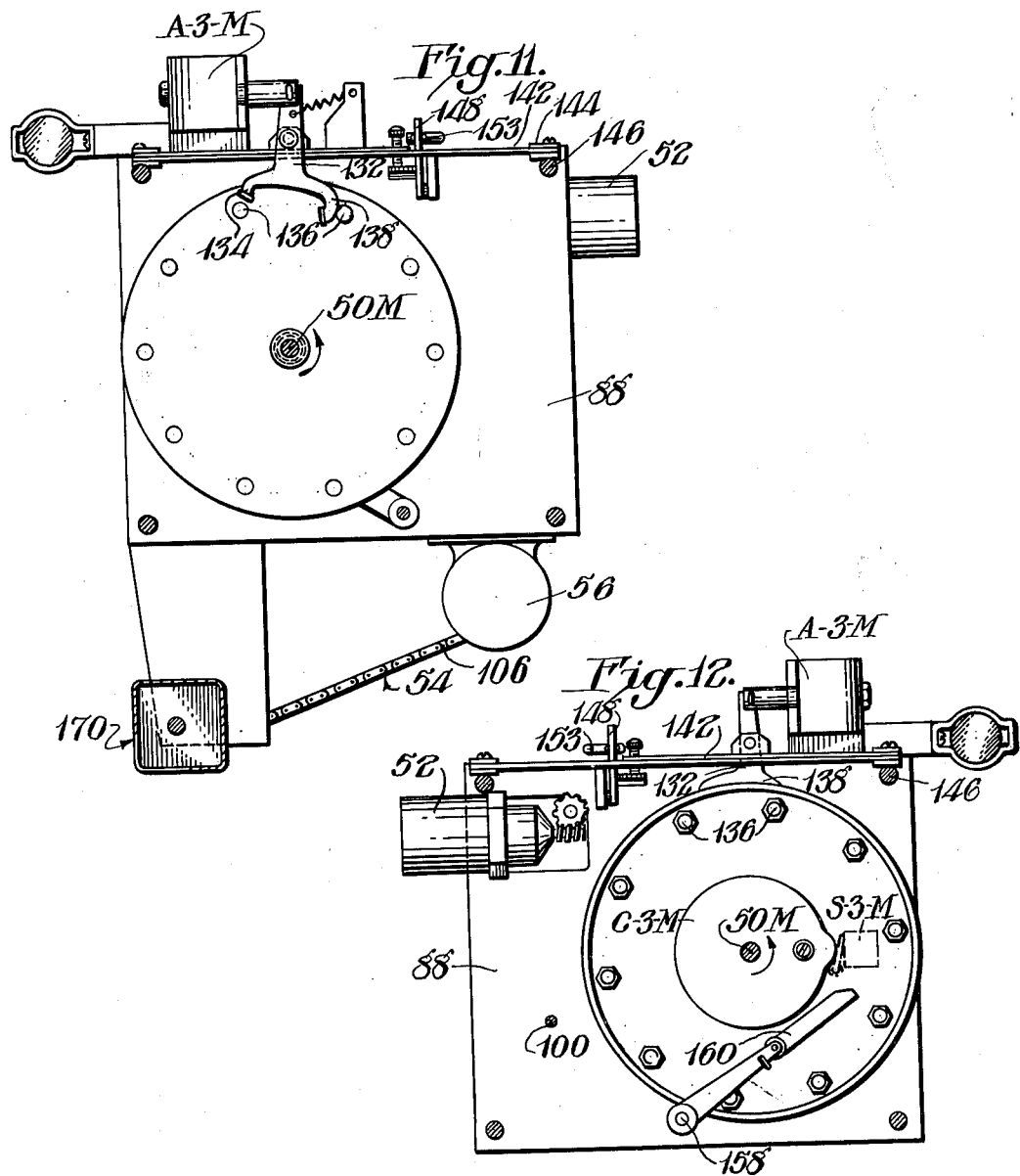

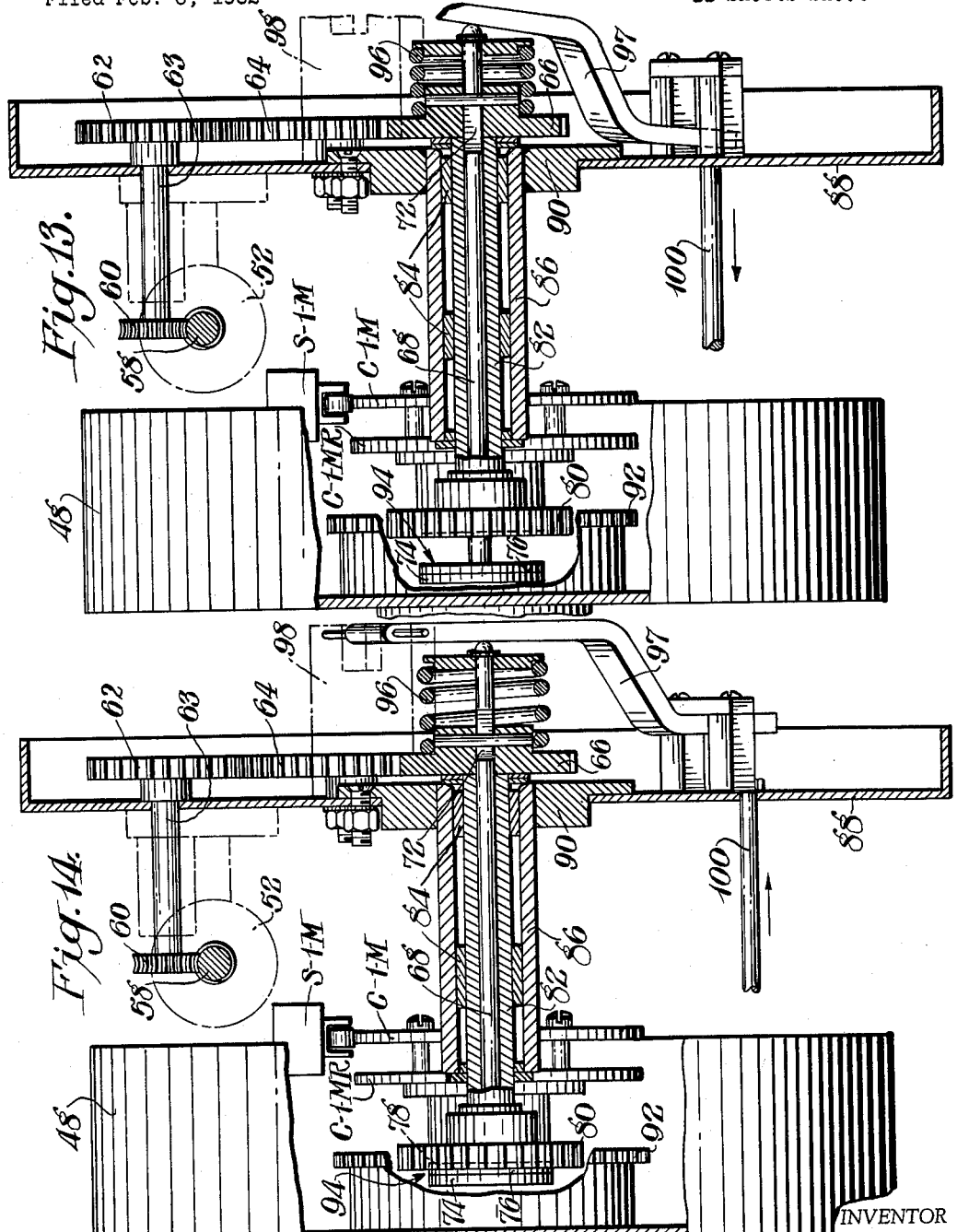

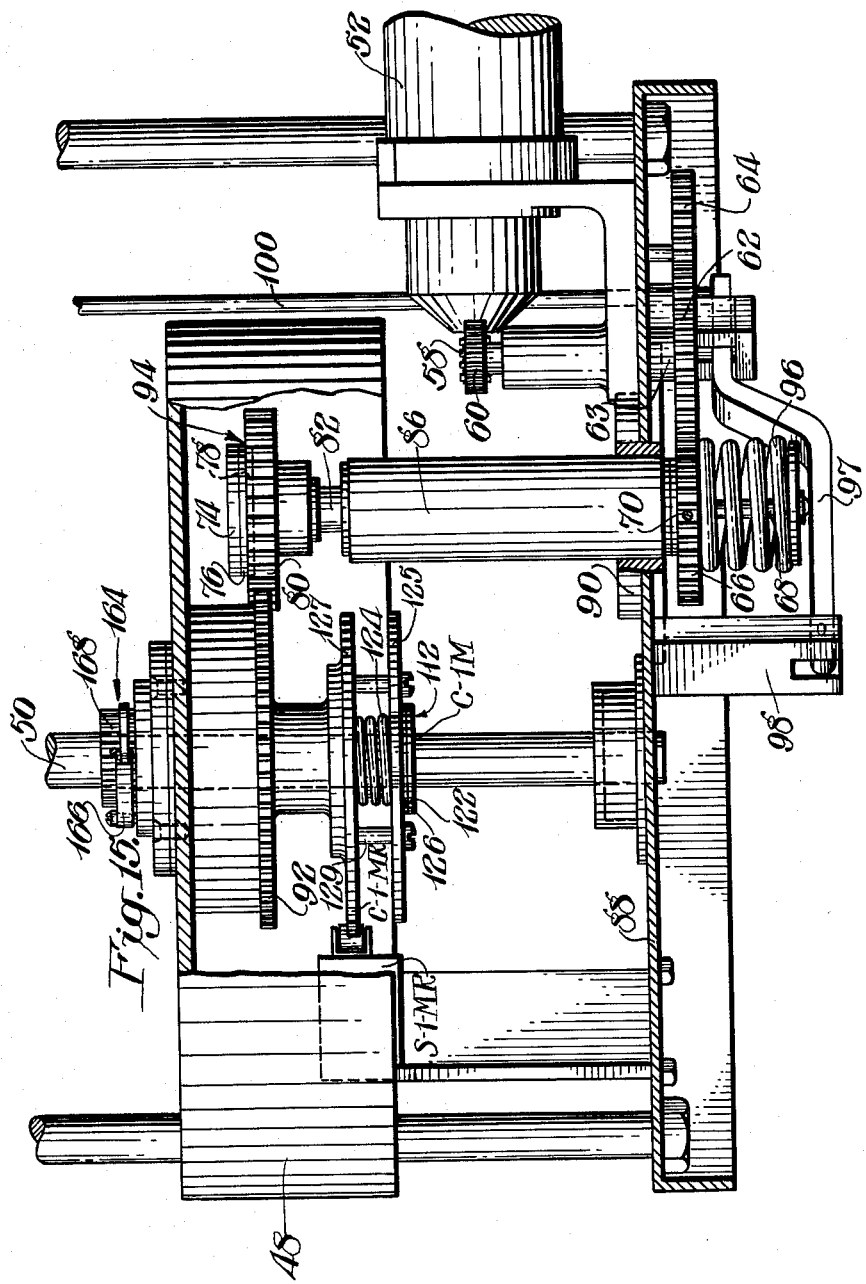

Aug. 6, 1963    R. G. SPALDING    3,100,062
INDICATING APPARATUS FOR DISPENSING SYSTEM
Filed Feb. 6, 1962    11 Sheets-Sheet 10
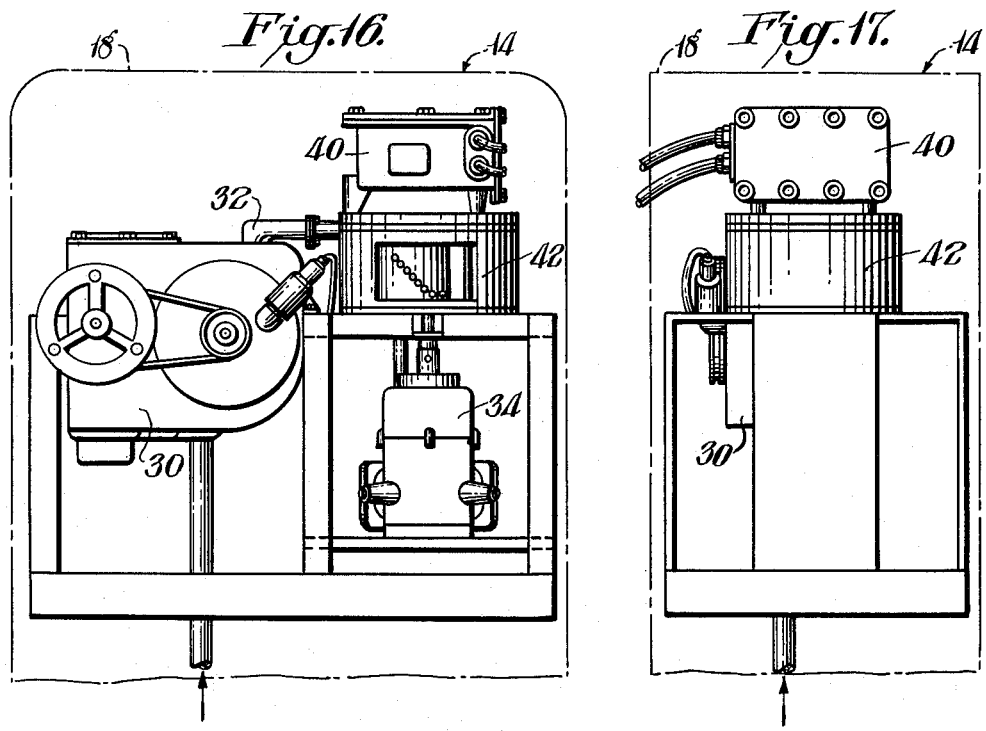
INVENTOR
*Robert G. Spalding*
BY *Connolly and Hutz*
ATTORNEYS

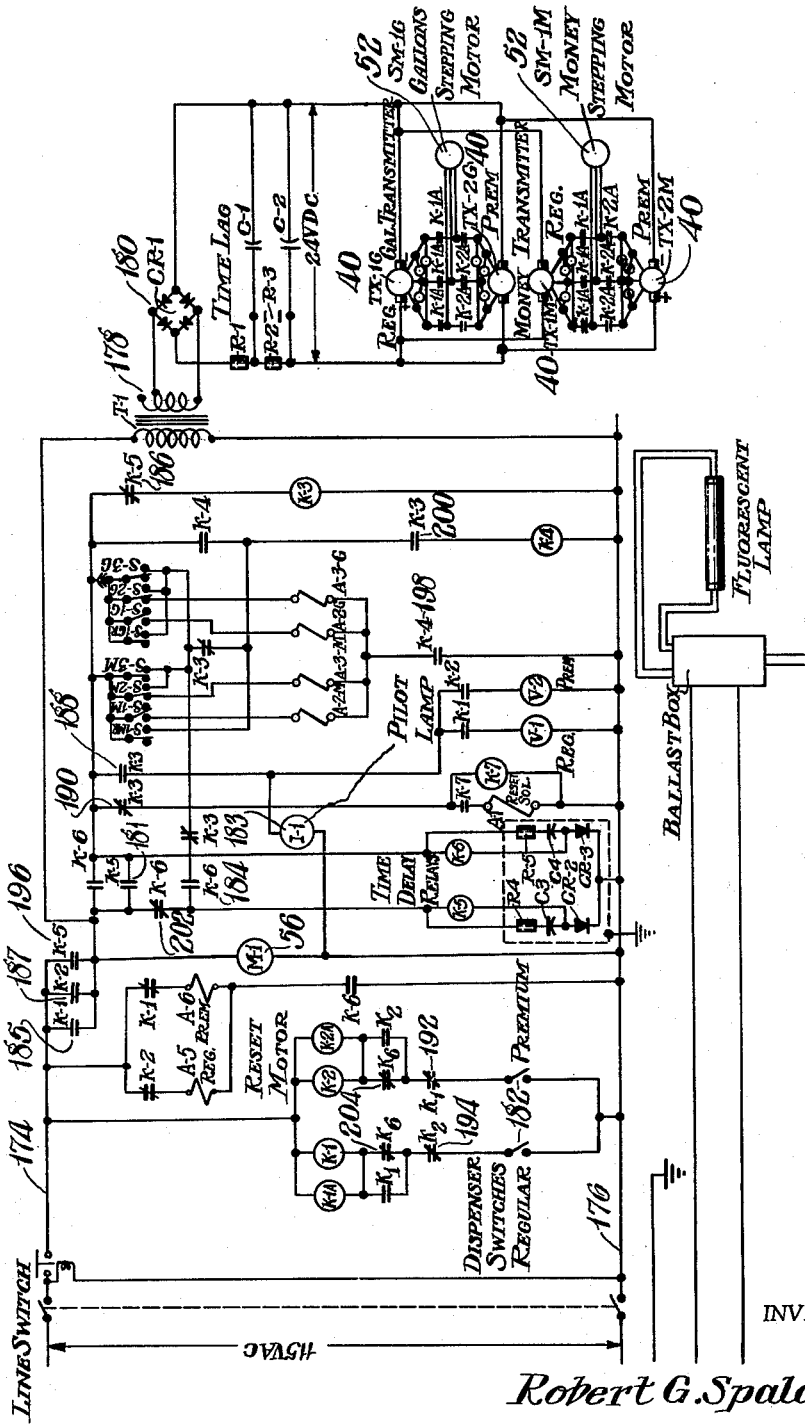

United States Patent Office 3,100,062
Patented Aug. 6, 1963

3,100,062
INDICATING APPARATUS FOR DISPENSING
SYSTEM
Robert G. Spalding, Bracknell, England, assignor to Symington Wayne Corporation, Salisbury, Md., a corporation of Maryland
Filed Feb. 6, 1962, Ser. No. 171,501
Claims priority, application Great Britain Feb. 8, 1961
8 Claims. (Cl. 222—35)

This invention relates to an electrical apparatus for providing an indication of the quantity dispensed from a dispensing system, and it more particularly relates to a remote-indicating form of such an apparatus for gasoline service stations.

It is quite advantageous to be able to position dispensing system indicators independently of the rest of the system and to utilize indicating elements that are as large as possible. Both of these requirements are particularly well satisfied by electrical types of indicators. Examples of electrical remote types of such indicators for use in gasoline service stations are described in U.S. Letters Patent 2,379,785 and 2,530,113. Such systems possess the advantage of disposing the dispensing and indicating components independently in positions which are respectively most convenient for the service station attendant and the motorist. However, existing systems of this type have not been simple, economical and dependable enough for widespread use.

An object of this invention is to provide an electrical indicating apparatus for a dispensing system which is relatively simple, economical and dependable in operation.

Another object is to provide such an indicating apparatus which is capable of remote disposition from the rest of the system.

In accordance with this invention the indicating component of a dispensing system, which may be positioned remotely from the rest of the system, includes two cooperating but separate electrical means for actuating the movement of its indicating elements. One of these actuating means is a receiver motor which is electrically connected in communication with a signal generator which is driven by a meter to provide a signal which is a function of the quantity dispensed. This receiver motor is connected to the lowest order indicating element by a disengageable clutch. The other actuating means is a motorized drive which is connected to each of the indicating elements through slip clutches. These slip clutches allow the disengageable clutch to override them thereby causing the receiver motor to superintend the movement of the indicating elements. A disengageable escapement connects the lower order to the higher order indicating elements for intermittently allowing the motorized drive to move the higher order indicating elements through the slip clutches to successively higher digits when the lower order elements respectively move throughout their full cycle of movement. Disengageable stops are connected to each of the indicating elements for arresting them in a zeroing position during a reset operation. A reset control disengages the clutch between the receiver motor and the lowest order indicating element and the escapements from the higher order indicating elements while the stop means are moved into their arresting positions thereby permitting the motorized drive to reset all of the indicating elements to a zeroing condition through the slip clutches.

This arrangement permits the motorized drive to provide most of the energy required to move the indicating elements from one position to the next and to reset all of them to a zeroing condition prior to commencement of each dispensing operation. The signal generator and receiver, which must be relatively precise, may, therefore, have a relatively low load capacity which highly minimizes their cost.

Detecting and interlocking means may be associated with the zero stop means and indicating elements for preventing the dispensing unit from operating unless the indicating elements are fully reset to a zeroing condition. The motorized driving means may also actuate the movement of a product indicator through a slip clutch for indicating the type of product being dispensed from a multi-product dispensing system. A selective stop mechanism arrests the product indicator in the proper position to indicate the selected product while its clutch is allowed to slip.

A particularly advantageous form of this invention utilizes resilient engaged friction clutches for both the diengageable and slip clutches. The slip clutches slip when the movement of the indicating elements is arrested by the receiver motor and escapements. However, a one-way drive in the forward direction may be interposed between the slip clutch and the lowest order indicating element to permit the receiver motor to drive the lowest order indicating element free of the slip clutch connected to it when the receiver motor rotates ahead faster than the rated speed of the motorized drive thereby conserving clutch friction material. At lower speeds the movement of the receiver motor only releases movement of its indicating element by the motorized drive, which minimizes the power required of the receiver motor.

The dispensing component may be conveniently split into two components, one being an ultimate dispensing station or hose stand for a gasoline service station including the necessary operating controls. The other dispensing components may contain a pump, a meter, and a signal generator connected to the receiver motor in the indicating component by electrical wiring. This invention therefore facilitates independent and remote positioning of dispensing and indicating element.

This invention also facilitates the use of relatively large indicating elements in the form of large diameter drums having sufficient space for relatively large indicating numbers around their relatively long peripheries. The power provided by the motorized drive and the dependability of the escapements connected to the higher order indicating elements permit a rather low capacity signal generator and receiver motor combination to actuate the precise rotation of relatively large indicating drums to dependably indicate quantity and cost information, which is clearly visible at appreciable distances. A motorist can accordingly observe such information with ease from within an automobile.

Novel features and advantages of the present invention will become apparent to one skilled in the art from a reading of the following description in conjunction with the accompanying drawings wherein similar reference characters refer to similar parts and in which:

FIG. 1 is a perspective view of dispensing and indicating components of one embodiment of this invention;

FIG. 2 is a partially schematic top plan view of the indicating and dispensing components shown in FIG. 1 in conjunction with a pumping component connected to storage tanks which supply it;

FIG. 3 is a top plan view of the internal mechanism of the indicating component shown in FIGS. 1 and 2;

FIG. 4 is a rear view in elevation of the mechanism shown in FIG. 3;

FIGS. 5 and 6 are respectively left side and right side views in elevation of the mechanism shown in FIGS. 3 and 4;

FIG. 7 is a cross-sectional view taken through FIG. 3 along the line 7—7;

FIG. 8 is a perspective view of a portion of the mechanism shown in FIGS. 3 and 4;

FIGS. 9-12 are cross-sectional views taken through FIG. 3 along respectively numbered lines;

FIGS. 13 and 14 are respectively cross-sectional views taken through FIG. 9 along the lines 13—13, 14—14 respectively in the clutch-disengaged and clutch-engaged conditions;

FIG. 15 is a top plan view of the portion shown in FIGS. 13 and 14 in cross-sectional and partially broken away in the clutch-engaged condition;

FIGS. 16 and 17 are respectively front and side views in elevation of the pumping component shown in FIG. 2; and FIG. 18 is a schematic diagram of the electrical system of the embodiment of this invention described in FIGS. 1-18.

In FIGS. 1 and 2 is shown a gasoline dispensing system including an indicating component 10, a dispensing component 12 and a pumping component 14. Indicating component 10 and dispensing component 12 are mounted upon island 16, and pumping component 14 enclosed within a simple rectangular casing 18 is installed for example behind service station building 20. These components can be split or grouped in any convenient manner, and the illustrated arrangement is merely representative.

Indicating component 10 includes a pair of indicating sections 22 and 24 for respectively indicating on two sides of island 16 both the number of gallons dispensed and the cost for the selected one of a pair of products such as regular and premium gasoline. Dispensing component 12 is essentially a stand for supporting dispensing hose and nozzle assemblies 26 upon it, and an "on" and "off" and "brand selector" control handle 28 is also mounted upon component 12.

Pumping component 14 includes a pair of combination pump motor and air eliminator units 30 of the type described in U.S. Patent 2,762,306 connected by piping 32 to a pair of quantity measuring meters 34, which are of the type described in U.S. Patent 2,756,726. Meters 34 are connected by pipes 36 to dispensing component 12 from which hose and nozzle assembly 26 discharge the gasoline which pumping units 30 abstract from a pair of tanks 38 containing for example two different products such as premium and regular grades of gasoline. Pumping unit 30 might also for example be of submersible type pump which is mounted within tanks 38, and under those conditions pumping component 14 need only contain the meter and a signal generator 40 connected to it through a variator 42, which may be of the type described in U.S. Patent 2,264,557. Variator 42 and the other components are described in detail in conjunction with FIGS. 16 and 17. Signal generator 40 and a receiver motor within indicating component 10 are for example of the D.C. Selsyn variety, and they are connected in communication with each other by suitable electrical wiring.

The mechanism within indicating component 10 is shown in detail in FIGS. 3-15. Referring to FIGS. 3 and 4, this mechanism includes a cost section 44 and a dispensed gallons indicating section 46. These sections are practically identical except for the form of numerals inscribed upon their indicating elements, and therefore only the cost-indicating section 44 is described in detail. Cost-indicating section 44 includes a set of indicating elements 48, which are for example relatively large diameter indicating drums approximately eight inches in diameter rotatably mounted upon a main longitudinal shaft 50. Indicating drums 48 are large enough to include ten numerals, which are approximately two inches high. This makes these numerals visible for a considerable distance, and the spacing of dispensing unit 12 from indicating unit 10 shown in FIG. 1 permits a motorist to easily observe the figures on indicating unit while the tank of his car is being filled from dispensing unit 12. Drums 48 progressing from left to right in FIG. 3 are respectively the cents, tens of cents and dollars drums or wheels as in any conventional gasoline dispenser. The left side drum 48 is therefore the lowest order indicating element, and the other two drums are higher order indicating elements, which bear higher order digits corresponding to tens of cents and dollars. The same is true of the drums 48 in quantity or gallon indicating section 46, which displays digits progressing from left to right for tenths of gallons, gallons and tens of gallons.

Indicating drums 48 are driven cooperatively from two separate driving sources. One is receiver motor 52 of the D.C. Selsyn type, and the other is a motorized drive 54 energized by reset or zeroizing driving motor 56 which is for example a fractional horsepower gear head motor.

Receiver motor 52 is connected to drive lowest order indicating drum 48 through a gear transmission including, as shown in FIG. 15, a worm 58 and pinion 60 connected to spur gear 62 by shaft 63 and, as most clearly shown in FIG. 13, spur gear 64 connects gear 62 to spur gear 66, which is angularly secured to transmission shaft 68 by a pin 70 inserted through slot 72. Clutch plate 74 is mounted upon the remote end of shaft 68, and it carries a disc 76 of friction material which engages within a recess 78 in the adjacent face of gear 80. Gear 80 is secured to tube 82 through which shaft 68 extends, and tube 82 is rotatably mounted within bearings 84 inside of support tube 86 connected to side wall 88 by a welded flange 90. Gear 80 then ultimately rotates lowest order indicating drum 48 by its engagement with gear 92, which is concentrically secured to drum 48 as shown in FIG. 9. Clutch plate 74, friction material 76 and recess 78 in gear 80 accordingly are components of a disengageable clutch between receiver motor 52 and lowest order indicating drum 48. Disengaeable clutch 94 is maintained engaged by a strong compression spring 96 mounted upon the outer hub of gear 66, and it is disengaged by the pressure of a clutch lever 97 pivoted in a yoke 98. The lower end of lever 97 is moved in a clutch disengaging direction by control rod 100 as later described in detail.

Motorized driving or resetting motor 56 as shown in FIG. 6, rotates sprockets 102 and 104 through sprocket chain 106 with which its sprocket 105 is engaged. Slip clutches 108, 110, 112 (which is more clearly shown in FIG. 15) connect motorized drive motor 56 to each of the indicating elements through aligned central shafts 50M and 50G upon which the indicating drums and slip clutches are mounted. Shafts 50M and 50G are longitudinally aligned to form shaft 50, and they extend completely through cost and gallon indicating sections 44 and 46. A universal coupling 114 connects shafts 50M and 50G for compensating for any misalignment between them. A single resetting motor 56 accordingly provides the motorized drive means for both of the illustrated indicating sections. The actuating springs for clutches 108, 110 and 112 are respectively springs 116, 118 and 124. Disengageable clutch 94 incorporating spring 96 is stronger than slip clutch 112 to permit it to override slip clutch 112 thereby causing clutch 94 and its connected receiver motor to superintend the rotation of lowest order indicating drum 48 and through it the higher order drums in a manner later described in detail.

In FIG. 15 is shown clutch 112 which includes a clutch plate 122 carrying a disc of friction material 126 which is engaged concentrically with movable clutch plate 125. Plate 125 mounted to slide on pins 129 secured to plate 127 for maintaining clutch 112 engaged. Clutch spring 124 reacts against plate 125 to maintain it engaged with friction material 126 to provide a clutch torque that is insufficient to overcome that provided by disengageable clutch 94 from the receiver motor, and it therefore slips when receiver motor clutch 94 opposes it.

A pair of disengageable escapement elements 128 are engaged with higher order drums 48 as shown in FIG. 8 for allowing the motorized driving motor through the slip clutches to move higher order indicating drums 48 to indicate successively higher digits when the lower order indicating drums respectively move through their full cycle of movement. Disengageable escapements 128 include solenoids A2M, A3M, A2G and A3G for rocking escapement catches 132, shown in detail in FIG. 11. As shown in FIGS. 8 and 11, holding arm 138 of escapement lever 132 normally engages and holds one of pins 136 attached to the side of higher order drum 48 when solenoid A3M is deenergized. Lever 132 is rocked to the left against spring 140 when solenoid A3M is energized to release holding arm 138 from pin 136 and interpose momentary arresting arm 134 in front of released pin 136 to prevent the following pin 136 from rotating past raised holding arm 138. When solenoid A3M is again deenergized, holding arm 138 moves into its normal holding condition shown in FIG. 11, in front of the next pin 136 to hold drum 48 in its next digit-indicating position against the force of the slip clutch connected to it.

As shown in FIG. 8, solenoids A2G and A3G are mounted upon leaf springs 142 which are hinged to brackets 144 upon frame rod 146.

Leaf springs 142 are lifted upwardly to disengage escapement catches 132 from pins 136 by rotation of L-shaped lever 148 connected to downwardly inclined bent rod 150, which is actuated by a control linkage including a pin 152 which contacts bent rod 150 for disengaging escapement catches 132 from pins 136. Rod 153 connects the control impulse to the escapements 128 on the cost section.

The normal actuation for A2G, A3G, A2M and A3M for moving the higher order indicating drums from one digit to the next is provided respectively by cams C1G, C2G, C1M and C2M, shown in FIG. 7. These cams are respectively associated with microswitches S1M, S2M, S1G and S2G respectively. Whenever these cams move through one cycle of revolution they actuate respective solenoids A2M, A3M, A2G and A3G to allow higher order drums 48 to be rotated the distance of one digit by the force of motor 52 transmitted through respective slip clutches which become activated when pins 136 of drums 48 are released.

The zeroizing or reset control for this apparatus is energized by solenoid A1, shown in FIGS. 4 and 8, which actuates pin 152 for releasing escapements 128. Bar 154 connected to solenoid A1 is also connected indirectly to pivoted lever 97 of disengageable clutches 94, and an extension bar 100 extends to disengageable clutch pivoted lever 97 of the cost section disengageable clutch 94 through its connection with parallelogram linkage bar 157. During the zeroizing operation, which is later described in detail, disengageable clutches 94 release to permit the slip clutches to the lowest indicating drum to rotate them to a zeroizing condition.

As shown in various figures and most clearly in FIG. 8, a zero stop means is provided for each of the indicating drums for arresting them in a zeroizing condition during their resetting motion energized by motorized drive 52 and the various slip clutches. This disengageable stop means includes a rotatable shaft 158 to which are connected resiliently jointed levers 160 whose ends abut against projections 162 connected to each of the indicating drums. Rotation of shaft 158 is actuated by the thrust of pin 159 on the bottom of rod 154 against the inclined cam projection 161 on rod 163 secured to rotate shaft 158.

Resiliently jointed levers 160 are moved upwardly towards respective projections 162, and then stop the lowest order drum in the exact zero condition and the higher order drums in the 9½ condition thereby permitting them to drop into place in a zero position when their disengageable escapements 128 are moved once more into engagement with them. The resilient jointing of these levers permits movement past them by pins 162 if contact should occur before the drums are actually in their zeroizing condition.

FIG. 15 shows a one-way drive 164 in the forward direction between the lowest order indicating element or drum 48 and slip clutch 112 connected to it for permitting the receiver motor to rotate the lowest order indicating element ahead without slipping slip clutch 112 when it rotates ahead faster than the rated speed of clutch disc 122 and friction material 126. This conserves clutch friction material; and since receiver motor 52 is rotated a good portion of its time at full speed to delivering a maximum rate of gasoline, considerable clutch material is saved by this arrangement. One-way clutch 164 includes a pawl 166 pivoted to the side of lowest order indicating drum 48 and a ratchet 168 connected to the drive from motor 52.

Detecting means are connected to the indicating drums for determining when all of them arrive at a zeroized condition such as the zero and 9½ positions previously described. These detecting means include cam switches S2M, S3M, S2G and S3G. It is therefore apparent that switches S2M are used both for transferring or energizing the escapement or transfer solenoids from lower to higher order indicating drums as well as for detecting means. A pair of cam switches S1MR and S1GR are respectively associated with the lowest order cost and gallon indicating drums 48 and respectively with cams C1MR and C1GR for indicating the zero position of the lowest order indicating drum. These various switches are connected in an interlocking circuit, which is later described in detail, to prevent the dispensing units from being operated unless all of the indicating drums are previously reset to a zeroized condition.

A product indicator 170, shown in FIG. 4, shows which of the two available products has been selected. Product indicator 170 includes two indicia on opposite faces for indicating the available products such as premium and regular gasoline and also the price of these products. Selectable stop means comprising solenoids A5 and A6 are provided for stopping product indicator 170 in the proper position to indicate the product selected. An auxiliary slip clutch 172 connects sprocket 104 to product indicator 170, and this permits it to be arrested in its proper indicating position by the proper solenoid A5 or A6 to indicate a selected product. This apparatus accordingly effectively utilizes slip clutches for simplifying both the mechanism and control circuit.

In FIGS. 16 and 17 are shown details of pumping unit 14 including meters 34 connected to signal generators 40 through variators 42 as well as a combination motor pump and air extractor unit 30. Variator 42 permits the price ratios to be varied in accordance with changing price conditions, and the entire pumping unit 14 may be conveniently positioned at a remote portion of the station because it serves no useful function to position it at the actual dispensing stations.

The electrical components of this invention and their mode of connection are shown in FIG. 18. These components are connected across main power lines 174 and 176 together with various control relays and components to provide a desired sequence of operation and interlocks to prevent undesirable modes of operation.

The righthand end of FIG. 18 shows the circuit of D.C. Selsyn signal generator 40 and receiver motor 52, which is energized through transformer 178 and full-wave rectifier 180. The main portion of FIG. 18 shows how motorized reset drive motor 56 is connected between the power lines together with the contacts of various relays for functions later described in detail.

Starting at the lefthand side of the diagram and reading toward the right, a pair of dispenser switches 182 for regular and premium products are connected across the lines in series with relays K1A, K1, K2 and K2A. Various contacts of these and other relays are connected in series with these relays for functions which are later described.

The next circuit energizes relay solenoids A5 and A6. Solenoids A5 and A6, shown in FIG. 4, arrest the brand drum indicator in its selected positions for indicating the selection of either the premium or regular grade in accordance with the actuation of regular or premium switch 182.

Motorized drive or reset motor 56 is the next illustrated circuit toward the right.

The next components connected across the line are time-delay relays K5 and K6. K5 is for example a one-half second delay relay of the fast-make slow-break type, and K6 is of the same type with a one second delay. These time delay relays maintain power on in parts of the circuit for a sufficient time to provide circuit control functions, which are later described in detail.

The next circuit across the line includes reset solenoid A1 whose functions are most clearly shown in FIG. 8 and also relay K7.

Solenoid valves V1 and V2 are connected in parallel with each other across the line respectively in series with normally open relays K1, K2 and K3. These solenoid valves cannot be energized if the dispenser is not completely reset or zeroized in a manner later described in detail.

The next group of components are escapement-releasing solenoids A2M, A3M, A2G and A3G in series with normally open contact K4 and a switching arrangement including microswitches S1MR, S1M, S2M, S3M and the corresponding gallon microswitches "G" to their right. As previously described in conjunction with FIG. 7, switches S1MR, S2M, S3M, S1GR, S2G and S3G act as sensors in conjunction with their corresponding cams upon drums 48 to determine the completion of the reset cycle. They are in position to open when the lowest order indicating element or drum 48 reaches zero and the higher order drums 48 reach 9½, and they remain open in the zeroizing stop position shown in FIG. 18. At the completion of the reset cycle when the higher order indicating drum drops the remaining distance from 9½ to zero into engagement with respective escapements 128, contacts S2M, S3M, S2G and S3G, close. However, switches S1MR adn S1GR remain open at zero because these drums do not drop any distance when the zero stops provided by jointed levers 160 disengage.

Of the former group switches, S2M and S2G also act to energize transfer solenoids A2M, A3M, A2G and A3G when the respective lower order drums reach the 9½ position. This utilization of a 9½ position for both transfer and zeroizing detecting permits switches S2M and S2G to be used for two functions, namely both for transfer and for detecting that their drums have been fully zeroized.

The next connected component is relay K4, and the last toward the right is relay K3, which in conjunction with relay K5 prevents the solenoid valves V1 and V2 from opening unless the drums are fully repositioned to the zeroized position, as previously described.

The functions of the various relays and interlock connections are facilitated by describing them in conjunction with their various control functions. The following description refers to the delivery of a regular grade of gasoline, and delivery of premium is identical utilizing corresponding components.

The regular grade gasoline nozzle is removed from the boot, which permits start handle 28 to be turned to the regular grade position. This causes the gallon and cost indicating drum 48 in indicating unit 10 to move forward in increasing numbers to zero. At the same time brand indicator drum 170 rotates to display the regular sign and the price per gallon for it. The pilot light 183 then goes on indicating that the unit is ready to deliver.

When regular dispenser switch 182 is closed, relays K1 and K1A in parallel to each other and in series with the dispenser switch 182 are energized. This closes normally opened contacts K1 and K2 in series with motorized drive motor 56 which starts it running.

Closure of contacts K1(185) and K2(187) at the upper left of FIG. 18 also energizes relay K5 through normally closed contact K6(202). Closure of contact K5(181) also energizes relay K6. This opens normally closed relay contact K6(202) which previously energized relay K5, but contact K6(184) maintains relay K5 still energized.

If any of drums 48 do not achieve the zeroizing positions formerly described, power will be transmitted through one of the zeroizing microswitches to maintain relay K5 energized. If relay K5 is maintained energized, normally closed relay K5(186) in series with relay K3 is maintained open, which in turn prevents relay K3 from closing contact K3(188) in series with solenoid valves V1 and V2 thereby preventing any gasoline from being dispensed. The dispenser is therefore not allowed to operate unless all of the indicating drums 48 are fully reset to their zeroized position.

After relay K3 is energized, it opens normally-closed contact K3(190) in series with reset solenoid A1 to de-energize it. This removes zero stop jointed levers 160 from engagement with drums 48 and allows escapements 128 to engage drums 48. This also engages disengageable clutches 94 between receiver motors 52 and lowest order indicating drums 48 to permit the receiver motor to superintend their movement and in conjunction with escapements 128 and transfer microswitches and cams to superintend the movement of the higher order indicating drums. The metering indications from meters 34 through variators 42 to signal generators 40 and electrically from signal generators 40 to receiver motors 52 for cost and quantity accordingly moves indicating drums 48 through the proper rotational movement to accurately indicate the number of gallons and the cost to a purchaser. A motorist can therefore sit in his car and observe the cost and quantity of gallons being pumped into the tank of his car.

The force transmitted by driving motor 56 through the slip clutches to one side of the indicating drums 48 accordingly minimizes the power required of receiver motor 52 which need only release its drag upon the lowest order indicating drum; or when it moves faster than the rated speed of drive motor 52, it will disengage from it by virtue of the one-way drive afforded by pawl 166 and ratchet 168 thereby conserving clutch friction material in slip clutch 112 from receiver motor 56 to the lowest order indicating drum.

Drive motor 56 can energize the movement of higher order indicating drums 48 when the proper transfer switches S1M, S2M, S1G and S2G are energized to energize respective transfer solenoids A2M, A3M, A2G and A3G for releasing actuating escapements 128 to allow in conjunction with pins 136 the higher order indicating drums 148 to move to indicate the next higher digit. In addition, drive motor 56 energizes the zeroizing operation when reset solenoid A1 disengages disengageable clutch 48 to release the effect of receive motor 52 from lowest order indicating drum thereby permitting the slip clutch 112 to also drive lowest order indicating drum as well as the higher order drums through their reset movement to arrestment upon jointed levers 160 in the zero stop position while escapements 128 are disengaged also by operation of reset solenoid A1.

The following events take place at the completion of delivery when dispenser switch 182 is turned off. The power is briefly maintained by time-delay relay K6 thereby allowing drive motor 56 to stop before brand drum solenoid A5 is released. This prevents the brand selector indicator 170 from being rotated out of position at the termination of the cycle of operations because time delay relay K6 has a longer time delay than relay K5, namely one second in comparison to one-half second.

The rest of the control circuit cooperates to insure that the proper operating sequence is maintained. These interlocks are each individually described in the following paragraphs.

Normally-closed relay contact K1(192) and normally-closed relay K2(194) respectively prevent each other's relays from being energized while each of them is closed. This prevents both types of gasoline from being dispensed at the same time.

The normally-opened relay contact K5(196) in series with drive motor 56 maintains power upon the motor for completing the reset or zeroizing cycle if the dispenser switch should be turned off before completion of the cycle. However, the delay of relay K5 is less than that of K6 as previously mentioned. As also previously mentioned, normally-opened contact K5(181) and normally closed relay contact K5(186) prevent relay K3 which controls solenoid valves V1 and V2 from closing and actuating them until the end of the zeroizing cycle is completed.

Normally-opened relay K4(198) in series with the transfer solenoids maintains the solenoids de-energized until the end of the reset cycle, which is indicated by the energization of relay K3 to close contact K3(200) in series with relay K4. If relay K4 did not remain energized, relay contact K4(198) opens to maintain the transfer solenoids de-energized until the reset operation is completed. This prevents a transfer movement of the highest order drum 48 at the end of the reset or zeroizing cycle, which might otherwise be accomplished.

Normally closed relay K6 contacts K6(202) and K6(204) prevent power from being reapplied to the unit during the time lag between the turning off of starting handle 28 and complete stopping of motor 56. In other words during the time delay where relay K6 is maintained energized, the normally-closed contacts are opened which provides a positive off period. In this period torque is removed from the brand drum clutch which allows solenoids A5 and A6 to completely release, and this positive off period also insures that the unit can never be tricked into incorrect operation, reset or wrong product display by manipulation of the start handle. The entire reset cycle will, therefore, have to be completed once that it is started, and during any of the final delay operations of the relays K5 and K6, it will not be possible to energize the unit.

What is claimed is:

1. An indicating apparatus for a dispensing system including an indicating unit and a dispensing unit, said apparatus comprising a meter connected to said dispensing unit for providing an output which is a function of the dispensed quantity, a signal generator connected to said meter for providing a transmittable signal, a receiver motor mounted upon said indicating unit, communication means connecting said receiver motor to said signal generator for actuating its operation in accordance with said dispensed quantity, a set of indicating elements movably mounted in said indicating unit for providing a visual indication which is a function of said dispensed quantity, said indicating elements corresponding to lower and higher order number digits of said dispensed quantity, a motorized driving means in said indicating unit, slip clutch means connecting said motorized driving means to each of said indicating elements for energizing their movement, disengageable clutch means connecting said receiver motor to the lowest order of said indicating elements for actuating its movement as a function of said dispensed quantity, said disengageable clutch means being arranged to override said slip clutch means for causing said receiver motor to superintend the movement of said lowest order indicating element, disengageable escapement means connecting said lower order to said higher order indicating elements for intermittently allowing said motorized driving means to move said higher order indicating elements to indicate successive digits when said lower order elements respectively are moved throughout their full cycle of movement, disengageable stop means operatively connected to each of said indicating elements for arresting their movement at a zeroizing condition; and reset control means connected to said disengageable clutch, said escapement means and said stop means for disengaging said single clutch and said escapement means from said indicating elements and for engaging said stop means with said indicating elements to permit said driving means to reset all of said indicating elements to said zeroizing conditions prior to a dispensing operation.

2. An apparatus as set forth in claim 1 wherein detecting means are connected to said indicating elements for determining when all of said indicating elements arrive at a zeroized condition, and an interlocking means connects said detecting means to said dispensing unit for preventing it from operating unless all of said indicating elements are zeroized.

3. An apparatus as set forth in claim 1 wherein said dispensing unit is selectively actuable for dispensing a number of products, a product indicator having indicia corresponding to said number of products being rotatably mounted in said indicating unit, an auxiliary slip clutch connecting said motorized drive to said product indicator, selectable stop means operatively associated with said product indicator, a product selector mounted upon said dispensing unit, and a connection between said product selector and said selectable stop means for arresting said product indicator during the resetting operation at the proper position to indicate the selected product being dispensed.

4. An apparatus as set forth in claim 1 wherein said indicating elements comprise rotatably mounted drums, said disengageable escapement means comprise pivoted levers rotatably mounted adjacent the periphery of said drums, said pivoted levers including a pair of prongs, one of said prongs being a normally holding prong, the other of said prongs being a momentary arresting prong, a series of pins about the periphery of said drums which are engageable by said prongs, an actuating solenoid connected to the end of said lever remote from said prongs, and means for energizing said actuating solenoid for withdrawing said holding prong from engagement with one of said pins and interposing said momentary arresting prong into the path of the following pin.

5. An apparatus as set forth in claim 4 wherein said solenoids and pivoted levers are mounted upon a leaf spring disposed above said drums, and one end of said leaf spring being pivoted to the frame of said apparatus to permit said escapements with their pivoted levers to be raised out of engagement with said pins.

6. An apparatus as set forth in claim 1 wherein said stop means comprise rotatably mounted stop levers adjacent said drums, one end of said levers extending within said drums, stop projections mounted within said drums for contacting the ends of said levers, said levers being resiliently jointed to permit said projections to deflect past said levers when passing through in one direction and for engaging upon the ends of said levers when contacting said levers adjacent said zeroized position, and a cammed actuating lever connected to said resiliently-jointed levers, and a solenoid-actuated control means contacting said cammed actuation lever for interposing said stop levers into the path of movement of said projection upon said indicating drums.

7. An apparatus as set forth in claim 1 wherein a solenoid-operated rod actuates the disengagement of said disengageable clutch from said lowest order indicating element, the disengagement of said escapements from said indicating elements and the interposition of said stop means into the path of movement of said indicating elements.

8. An apparatus as set forth in claim 3 wherein said reset control means is arranged for maintaining power upon said selectable stop means a short time after said motorized drive means is de-energized thereby insuring that said motorized drive means stops before said selectable drive means disengages for insuring release of said selectable stop means free of torque and preventing said motorized drive means from moving said product indicator out of position.

No references cited.